(12) United States Patent
Carter et al.

(10) Patent No.: US 11,193,868 B2
(45) Date of Patent: Dec. 7, 2021

(54) IN-SITU SOLID ROCKET MOTOR PROPELLANT GRAIN AGING USING HYDRAULICALLY ACTUATED BLADDER

(71) Applicant: GOODRICH CORPORATION, Charlotte, NC (US)

(72) Inventors: Joshua David Carter, Fairfield, CA (US); Kevin Mueller, Dixon, CA (US)

(73) Assignee: Goodrich Corporation, Charlotte, NC (US)

( * ) Notice: Subject to any disclaimer, the term of this patent is extended or adjusted under 35 U.S.C. 154(b) by 279 days.

(21) Appl. No.: 16/386,099

(22) Filed: Apr. 16, 2019

(65) Prior Publication Data
US 2020/0333226 A1    Oct. 22, 2020

(51) Int. Cl.
*F02K 9/08* (2006.01)
*G01N 3/32* (2006.01)
*C06B 45/10* (2006.01)

(52) U.S. Cl.
CPC ............. *G01N 3/32* (2013.01); *C06B 45/105* (2013.01); *G01N 2203/0019* (2013.01)

(58) Field of Classification Search
CPC .. G01N 2203/0212; G01N 3/08; G01N 33/22; G01N 3/10; G01N 2203/0044; G01N 2203/0274; G01N 2203/0676; F05D 2260/83; F05D 2220/80; F02K 9/10; F02K 9/36; F02K 9/38; F42B 39/00; D03D 23/00

See application file for complete search history.

(56) References Cited

U.S. PATENT DOCUMENTS

| | | | |
|---|---|---|---|
| 2,988,877 A | 6/1961 | Shope | |
| 3,121,993 A | 2/1964 | Pennington | |
| 3,533,485 A | 10/1970 | Buffum, Jr. | |
| 3,583,162 A | 6/1971 | Neely | |
| 3,662,592 A * | 5/1972 | Geisler | G01N 21/8803 73/104 |
| 3,937,070 A | 2/1976 | Briar | |
| 4,664,234 A | 5/1987 | Wight | |
| H682 H | 10/1989 | Betts | |
| 4,925,503 A | 5/1990 | Canterberry et al. | |

(Continued)

FOREIGN PATENT DOCUMENTS

| | | |
|---|---|---|
| CN | 104820083 | 8/2016 |
| EP | 2581594 | 4/2013 |
| WO | 2017034773 | 3/2017 |

OTHER PUBLICATIONS

European Patent Office, European Search Report dated Jun. 24, 2020 in Application No. 19213315.5.

(Continued)

*Primary Examiner* — Brandi N Hopkins
(74) *Attorney, Agent, or Firm* — Snell & Wilmer L.L.P.

(57) ABSTRACT

A method for non-destructively determining a mechanical property of a solid rocket motor propellant grain may comprise applying a force to a surface of the solid rocket motor propellant grain, wherein a deformation is formed on the surface of the solid rocket motor propellant grain in response to the applying, and calculating a value of the mechanical property of the solid rocket motor propellant grain based on the deformation. This process may be performed over time to determine a lifespan of the propellant grain.

19 Claims, 5 Drawing Sheets

(56) References Cited

U.S. PATENT DOCUMENTS

| | | | |
|---|---|---|---|
| 5,038,295 | A | 8/1991 | Husband et al. |
| 5,540,794 | A | 7/1996 | Willer et al. |
| 5,582,001 | A | 12/1996 | Bradford et al. |
| 6,966,264 | B2 | 11/2005 | Solberg |
| 7,077,011 | B2 | 7/2006 | Johnson |
| 7,652,488 | B1 * | 1/2010 | Lopatin ............... F02K 9/32 |
| | | | 324/681 |
| 8,210,052 | B1 | 7/2012 | Biggs |
| 9,329,113 | B2 | 5/2016 | Herakles |
| 2006/0032562 | A1 | 2/2006 | Wight et al. |
| 2008/0110274 | A1 | 5/2008 | Johnson et al. |
| 2013/0255223 | A1 | 10/2013 | Brady |
| 2016/0084059 | A1 | 3/2016 | Moore |

OTHER PUBLICATIONS

European Patent Office, European Search Report dated Jul. 10, 2020 in Application No. 19214281.8.

European Patent Office, European Search Report dated Jul. 9, 2020 in Application No. 19213893.1.

Euorpean Patent Office, European Search Report dated Jul. 27, 2020 in Application No. 19216310.3.

USPTO, Pre-Interview First Office Action dated Feb. 18, 2021 in U.S. Appl. No. 16/386,141.

USPTO, Pre-Interview First Office Action dated Feb. 18, 2021 in U.S. Appl. No. 16/386,186.

USPTO, Pre-Interview First Office Action dated Apr. 23, 2021 in U.S. Appl. No. 16/386,186.

USPTO, Restriction/Election Requirement dated Apr. 30, 2021 in U.S. Appl. No. 16/386,169.

USPTO, First Action Interview Office Action dated May 25, 2021 in U.S. Appl. No. 16/386,186.

USPTO, Notice of Allowance dated Jun. 10, 2021 in U.S. Appl. No. 16/386,141.

USPTO, Corrected Notice of Allowance dated Jun. 23, 2021 in U.S. Appl. No. 16/386,141.

* cited by examiner

APPLYING A FIRST FORCE TO A SURFACE OF THE PROPELLANT GRAIN AT A FIRST TIME, WHEREIN A FIRST DEFORMATION IS FORMED ON THE SURFACE OF THE PROPELLANT GRAIN IN RESPONSE TO THE FIRST FORCE — 210

CALCULATING A FIRST VALUE OF THE MECHANICAL PROPERTY OF THE PROPELLANT GRAIN, BASED ON THE FIRST DEFORMATION — 220

APPLYING A SECOND FORCE TO THE SURFACE OF THE PROPELLANT GRAIN AT A SECOND TIME, A SECOND DEFORMATION FORMED ON THE SURFACE OF THE PROPELLANT GRAIN IN RESPONSE TO THE SECOND FORCE — 230

CALCULATING A SECOND VALUE OF THE MECHANICAL PROPERTY OF THE PROPELLANT GRAIN, BASED ON THE SECOND DEFORMATION — 240

DETERMINING THE LIFESPAN OF THE PROPELLANT GRAIN, BASED ON THE FIRST VALUE AND THE SECOND VALUE — 250

IN-SITU SOLID ROCKET MOTOR PROPELLANT GRAIN AGING USING HYDRAULICALLY ACTUATED BLADDER

FIELD

The present disclosure relates generally to solid rocket motors, and more particularly, to systems and methods for assessing propellant grain lifespan.

BACKGROUND

Rocket propellant grains rely on a polymer binder for their structural integrity. Changes to structural integrity may be described by a change in mechanical properties that, in part, determines the propellant grain lifespan. While the chemical composition of a polymer type affects the way it ages, the changes in propellant grain mechanical properties due to polymer aging are a factor in determining propellant grain lifespan. One method of assessing the lifespan of a solid rocket motor is by destructively disassembling the solid rocket motor to measure mechanical properties of the propellant grain.

SUMMARY

A method for non-destructively aging a solid rocket motor propellant grain is disclosed, comprising applying a force to a surface of the solid rocket motor propellant grain via a liquid, wherein a deformation is formed on the surface of the solid rocket motor propellant grain in response to the application of the force, and measuring at least one of a pressure of the liquid and a volume of the liquid.

In various embodiments, the propellant grain is a solid mass with an exposed inner surface area defining a perforation in the interior of the solid rocket motor propellant grain.

In various embodiments, the method further comprises determining a lifespan of the solid rocket motor propellant grain based on at least one of the pressure of the liquid and the volume of the liquid.

In various embodiments, the method further comprises disposing a bladder into the perforation, moving the liquid into the perforation, wherein the force is applied to the surface in response to the liquid being moved into the perforation of the solid rocket motor propellant grain, and measuring the pressure of the liquid immediately after the liquid has reached equilibrium with the propellant grain.

In various embodiments, the liquid is pressurized in response to moving the liquid into the perforation, wherein the deformation is formed in response to the liquid being pressurized.

In various embodiments, the liquid is contained within the bladder.

In various embodiments, the bladder is configured to expand solely in a radial direction.

In various embodiments, the method further comprises calculating a value of a mechanical property of the solid rocket motor propellant grain based upon the deformation, wherein the mechanical property comprises a bulk relaxation modulus (k) calculated using equation $$k = \frac{P}{\frac{\Delta V}{V_{initial}}},$$

where P is the measured pressure, $\Delta V$ is a change in volume of the bladder, and $V_{initial}$ is a volume of the bladder before it expands against the propellant grain.

A method for non-destructively surveilling a mechanical property of a solid rocket motor propellant grain is disclosed, comprising applying a first force to a surface of the solid rocket motor propellant grain at a first time, wherein a first deformation is formed on the surface of the solid rocket motor propellant grain in response to the applying the first force, measuring a first value of a relaxation modulus of the solid rocket motor propellant grain based on the first deformation, applying a second force to the surface of the solid rocket motor propellant grain at a second time, wherein a second deformation is formed on the surface of the solid rocket motor propellant grain in response to the applying the second force, and measuring a second value of the relaxation modulus of the solid rocket motor propellant grain based on the second deformation, wherein at least one of the first force or the second force is applied to the surface by moving a liquid into a bladder disposed at least partially within a perforation of the solid rocket motor propellant grain.

In various embodiments, the method further comprises comparing the first value with the second value.

In various embodiments, the method further comprises predicting a future value of the relaxation modulus based on a trend between the first value and the second value.

In various embodiments, the method further comprises determining a remaining lifespan of the solid rocket motor propellant grain based on a comparison between the future value and a pre-determined design threshold.

In various embodiments, the liquid is pressurized in response to moving a pre-determined volume of the liquid into the perforation.

In various embodiments, the liquid is moved into the bladder until the liquid reaches a predetermined pressure.

In various embodiments, at least one of the first deformation or the second deformation is formed in response to the liquid being pressurized.

In various embodiments, the first value of the relaxation modulus is measured by measuring a pressure of the liquid.

In various embodiments, the first value of the relaxation modulus is measured by measuring a volume of the liquid.

A solid rocket motor propellant grain arrangement is disclosed, comprising a case, a propellant grain disposed within the case, a perforation extending through the propellant grain, and a bladder disposed within the perforation, wherein the bladder is configured to receive a pre-determined volume of a liquid, expand in response to receiving the pre-determined volume of the liquid, and deform a surface of the propellant grain in response to the expanding.

In various embodiments, the solid rocket motor propellant grain arrangement further comprises a hose coupled to the bladder extending from the propellant grain and in fluid communication with a liquid supply.

In various embodiments, the solid rocket motor propellant grain arrangement further comprises a pressure gauge in fluid communication with the bladder.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
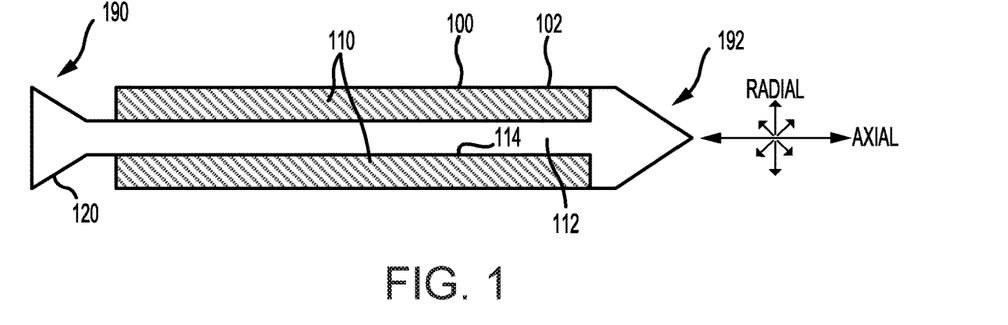
FIG. 1 illustrates a cross section view of a solid rocket motor comprising a propellant grain having a perforation, in accordance with various embodiments.

With reference to FIG. 1, a solid rocket motor 100 is illustrated, in accordance with various embodiments. Solid rocket motor 100 may comprise an aft end 190 and a forward end 192. Solid rocket motor 100 may comprise a casing 102 extending between aft end 190 and forward end 192. In various embodiments, casing 102 may comprise a cylindrical geometry. Solid rocket motor 100 may comprise a nozzle 120 disposed at aft end 190. Nozzle 120 may be coupled to casing 102. Solid rocket motor 100 may comprise a solid rocket motor propellant grain (propellant grain) 110 disposed within casing 102. In various embodiments, propellant grain 110 may be comprised of a solid fuel, such as a pure fuel, inert without an oxidizer. For example, propellant grain 110 may comprise a hydroxyl-terminated polybutadiene (HTPB), a polymethyl methacrylate (PMMA), or a polyethylene (PE), among others. In various embodiments, propellant grain 110 may be comprised of a composite propellant comprising both a fuel and an oxidizer mixed and immobilized within a cured polymer-based binder. For example, propellant grain 110 may comprise an ammonium nitrate-based composite propellant (ANCP) or ammonium perchlorate-based composite propellant (APCP), among others. Propellant grain 110 may be a solid mass with an exposed inner surface area defining a perforation volume (also referred to herein as a perforation) in the interior of the solid rocket motor. In this regard, propellant grain 110 may comprise a perforation 112. Perforation 112 may be defined by a bore extending axially through propellant grain 110.

A mechanical property envelope may describe the minimum and maximum performance values necessary for a propellant grain to function as designed. The calculated mechanical property envelope is typically derived from a series of tests to determine propellant failure limits under various loading conditions. When a propellant sample mechanical property falls outside of the calculated envelope, the propellant grain service life is at an end.

The mechanical properties of the propellant comprising the grain can be measured both immediately after curing and after an accelerated aging period. Typically, the measurements are performed on propellant samples produced simultaneously with the production of propellant grains. Accelerated aging of the propellant samples is usually achieved through exposure to high temperatures for a duration of time designed to mimic the passage of time. The mechanical properties of the propellant grain contained within the rocket motor are typically assumed to be represented by the simultaneously produced propellant samples. The service life of the propellant grain is then assumed to be represented by the performance of the propellant samples subjected to accelerated aging, with a conservative reduction to compensate for potential variation between propellant sample and propellant grain.

To validate the typical assumption that the propellant grain within the rocket motor is accurately represented by the propellant samples, it may be desirable to calculate mechanical properties of a propellant grain to determine the health of the corresponding solid rocket motor. Typically, in order to determine the health of a plurality of solid rocket motors, a sacrificial solid rocket motor is disassembled using destructive means to gain access to the propellant of the sacrificial solid rocket motor in order to take proper measurements. The sacrificial solid rocket motor would typically be similar to the plurality of solid rocket motors (e.g., same type, age, storage conditions, etc.). Stated differently, a solid rocket motor is sacrificed in order to estimate the health of a plurality of similar solid rocket motors.

The present disclosure, as described herein, provides systems and methods for non-destructively surveilling solid rocket motor propellant grains for predicting the lifespan and the remaining lifespan of the solid rocket motor.

Figure 2:
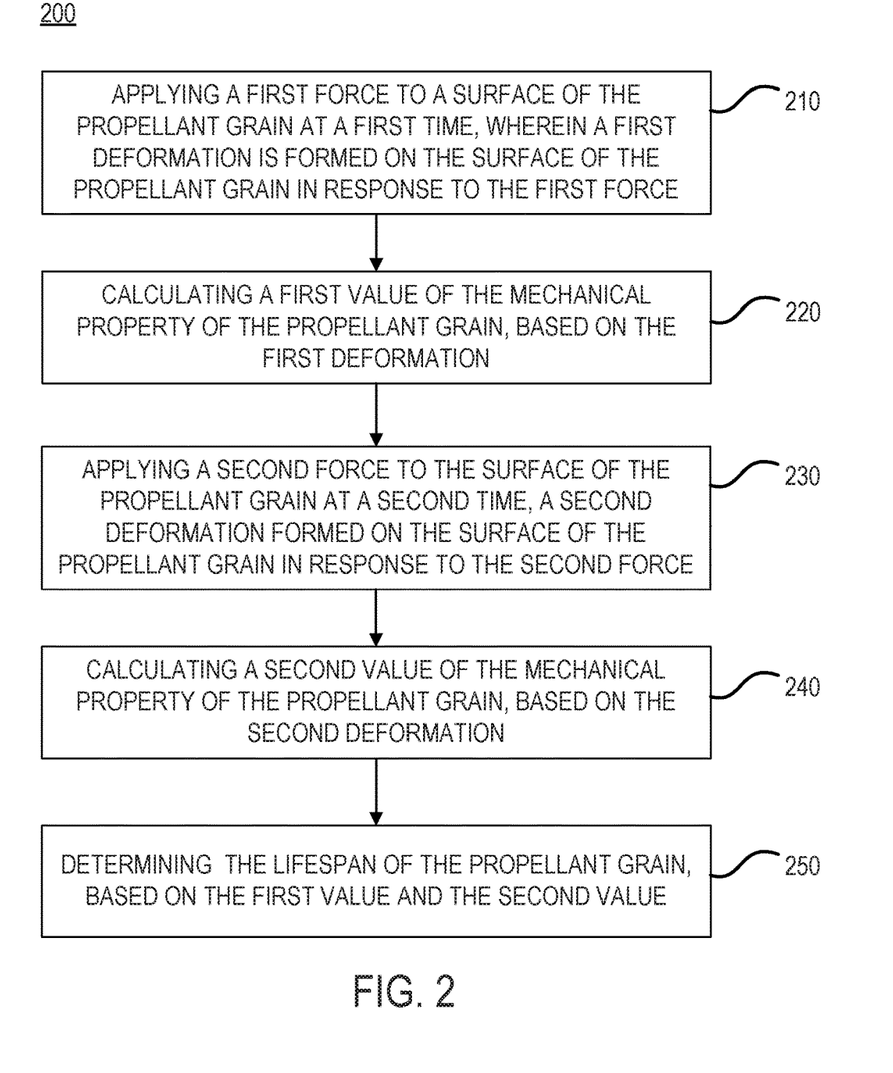
FIG. 2 illustrates a method for non-destructively surveilling a mechanical property of a solid rocket motor propellant grain, in accordance with various embodiments.

With reference to FIG. 2, a method 200 for non-destructively surveilling a mechanical property of a solid rocket motor propellant grain is illustrated, in accordance with various embodiments. Method 200 includes applying a first force to a surface of the propellant grain at a first time, wherein a first deformation is formed on the surface of the propellant grain in response to the first force (step 210). Method 200 includes calculating a first value of the mechanical property of the propellant grain, based on the first deformation (step 220). Method 200 includes applying a second force to the surface of the propellant grain at a second time, a second deformation formed on the surface of the propellant grain in response to the second force (step 230). Method 200 includes calculating a second value of the mechanical property of the propellant grain, based on the second deformation (step 240). Method 200 includes determining the remaining lifespan of the propellant grain, based on the first value and the second value (step 250) and through comparison of their values with the modeled performance minima and/or maxima.

With combined reference to FIG. 1 and FIG. 2, step 210 and step 230 may include applying a force to surface 114 of propellant grain 110. The force may be applied via a variety of devices and/or methods, as will be described with further detail herein. Surface 114 may be an inner surface of propellant grain 110. Surface 114 may be a radially displayed inner surface of propellant grain 110. Surface 114 may define perforation 112. Perforation 112 may comprise a bore formed through propellant grain 110. A deformation may be formed in propellant grain 110 in response to the force. For example, a deformation may be formed in surface 114 in response to the force. Step 220 and step 240 may include calculating a mechanical property of propellant grain 110, based upon the respective deformations. For example, a mechanical property that may be calculated is the bulk relaxation modulus (k) of propellant grain 110. As will be described with further detail herein, the amount of deformation of the propellant grain 110 in response to a given force, may indicate the magnitude of the bulk relaxation modulus (k) of propellant grain 110.

In various embodiments, step 210 may occur at a first time and step 230 may occur at a second time. Similarly, step 220 may occur during the first time and step 240 may occur during the second time. For example, step 230 and step 240 may occur a year or more after step 210 and step 220. In this regard, the health of solid rocket motor 100 may be surveilled over a period of time. With additional reference to FIG. 3A, a plot 300 of various bulk relaxation modulus (k) values calculated over time is illustrated, in accordance with various embodiments. For example, first value 302 may be calculated at a first time, second value 304 may be calculated at a second time, and third value 306 may be calculated at a third time. A trend (also referred to herein as a curve) 310 may be determined based on first value 302, second value 304, and third value 306. For example, a curve of best fit (i.e., curve 310) may be determined using any suitable method including, but not limited to, interpolation, polynomial interpolation, smoothing, line fitting, curve fitting, extrapolation, analytic models, etc. Although illustrated as having three separate values, it is contemplated that curve 310 may be determined using two or more values. For example, using solely first value 302 and second value 304, or using more than three values.

Figure 3A:
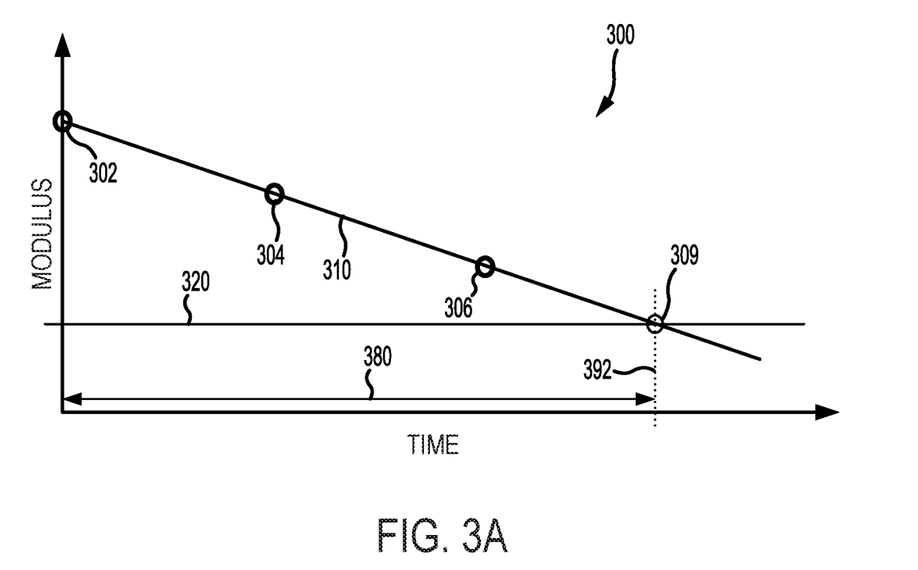
FIG. 3A and FIG. 3B illustrate plots of bulk relaxation modulus of a propellant grain versus time, in accordance with various embodiments.

Curve 310 may be used to determine a future value 309. For example, curve 310 may be compared with a pre-determined threshold value 320 of bulk relaxation modulus (k) and a time 392 at which curve 310 will intersect with pre-determined threshold value 320 may be used to define future value 309. In this regard, curve 310 may be extrapolated to estimate a time 392 at which the mechanical property (e.g., bulk relaxation modulus (k)) will reach the pre-determined threshold value 320. Value 320 can be determined by modeling and calculation, through measurement of propellant samples subjected to accelerated aging, or by destructive testing of a sacrificial solid rocket motor. In this regard, it may be determined that solid rocket motor 100 has a lifespan of duration 380. Duration 380 may be measured in units of time, such as years, months, or days, for example.

Figure 3B:
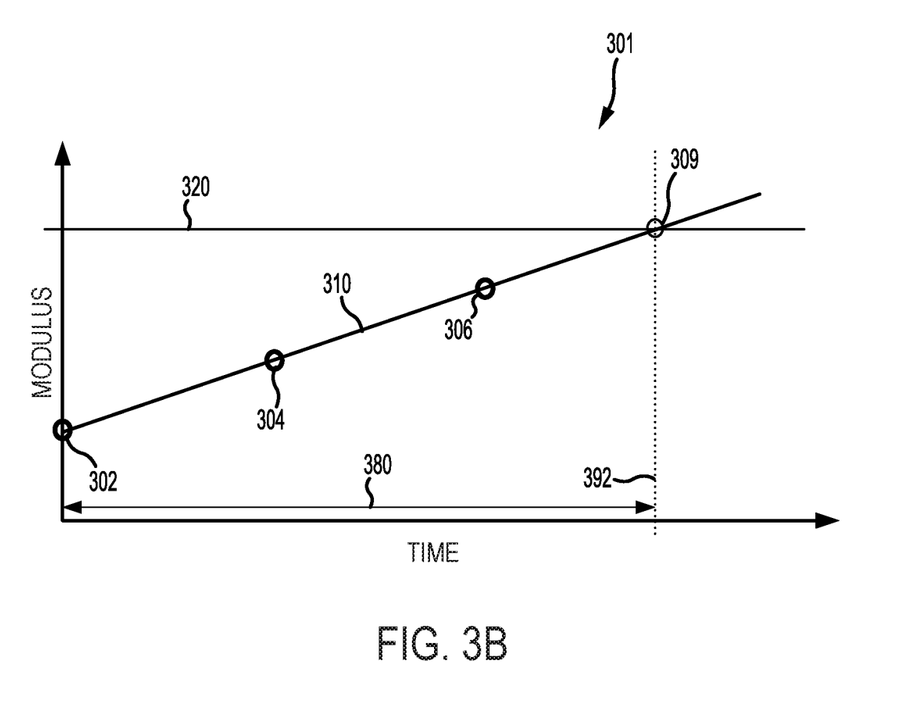

With reference to FIG. 3B, a plot 301 of various bulk relaxation modulus (k) values calculated over time is illustrated, in accordance with various embodiments. Plot 301 differs from plot 300 of FIG. 3A in that the propellant grain bulk relaxation modulus (k) of plot 301 increases over time. Thus, methods described herein may be suitable for propellant grains that have a bulk relaxation modulus (k) that increase or decrease over time. Stated differently, methods described herein may be suitable for propellant grains that soften or harden over time.

Figure 4:
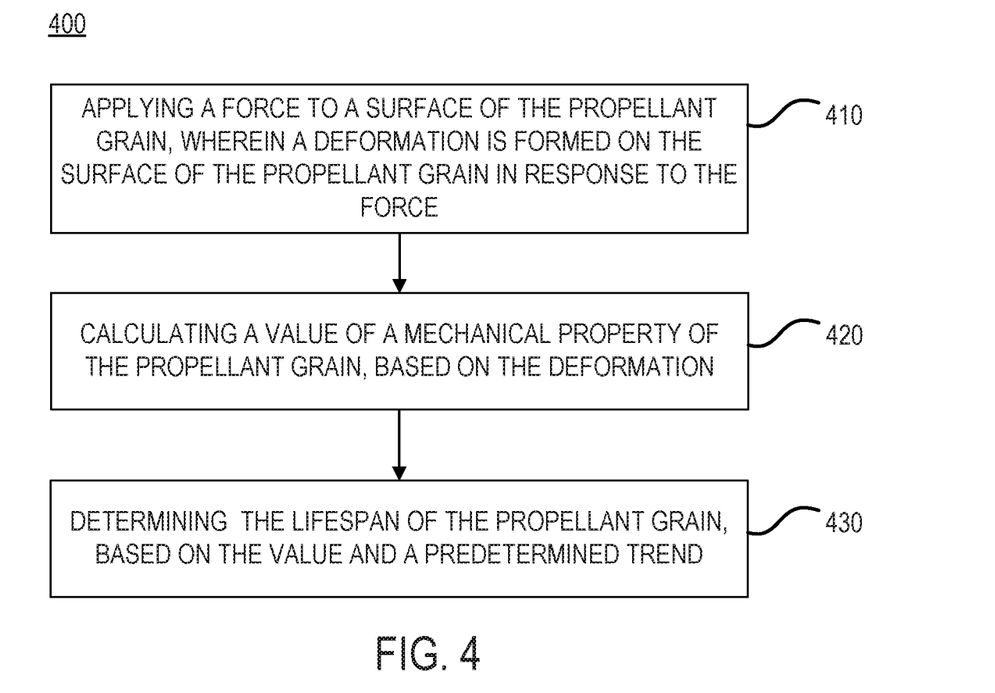
FIG. 4 illustrates a method for non-destructively surveilling a mechanical property of a solid rocket motor propellant grain, in accordance with various embodiments.

Having described a method for non-destructively surveilling a mechanical property of a solid rocket motor propellant grain using two measured values, it is contemplated herein that a method for non-destructively surveilling a mechanical property of a solid rocket motor propellant grain may be performed using only a single measured value. With reference to FIG. 4 a method 400 for non-destructively surveilling a mechanical property of a solid rocket motor propellant grain is illustrated, in accordance with various embodiments. Method 400 includes applying a force to a surface of the propellant grain, wherein a deformation is formed on the surface of the propellant grain in response to the force (step 410). Method 400 includes calculating a value of a mechanical property of the propellant grain, based on the deformation (step 420). Method 400 includes determining the remaining lifespan of the propellant grain, based on the calculated value and a predetermined trend (step 430).

Figure 5:
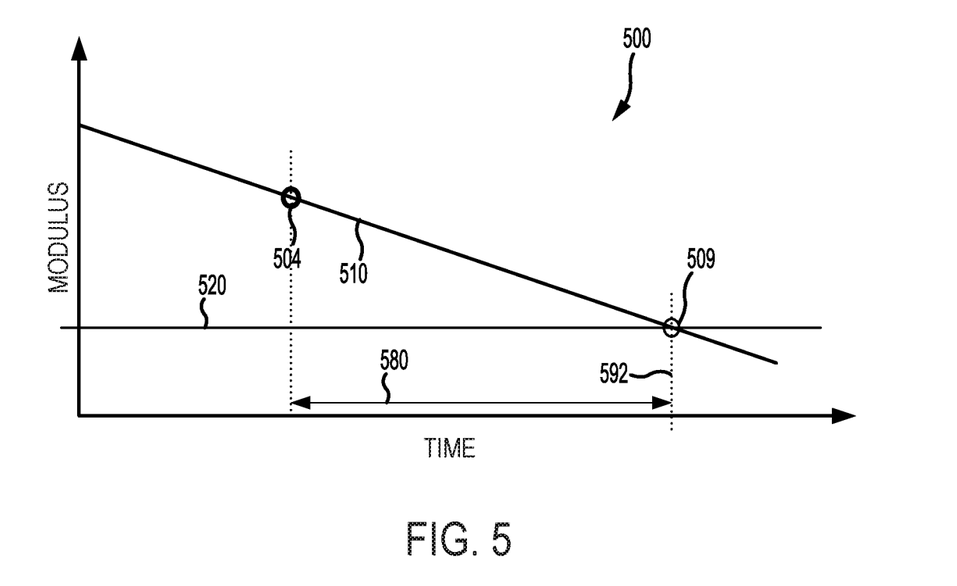
FIG. 5 illustrate plots of bulk relaxation modulus of a propellant grain versus time, in accordance with various embodiments.

With combined reference to FIG. 1 and FIG. 4, step 410 may include applying a force to surface 114 of propellant grain 110. Step 420 may include calculating a mechanical property of propellant grain 110, based upon the deformation. For example, a mechanical property that may be calculated is the bulk relaxation modulus (k) of propellant grain 110. Step 430 may include comparing the calculated bulk relaxation modulus (k) of propellant grain 110 with a predetermined trend which represents that of propellant grain 110, for example using a trend representing the performance (i.e., bulk relaxation modulus) of a propellant sample subjected to an accelerated aging process, or a trend calculated using a model produced by the structural analysis of the propellant grain. In various embodiments, the predetermined trend is determined by modeling and calculation, through measurement of propellant samples subjected to accelerated aging, and/or by destructive testing of a sacrificial solid rocket motor With additional reference to FIG. 5, a plot 500 of a calculated bulk relaxation modulus (k) value with respect to a predetermined trend is illustrated, in accordance with various embodiments. For example, value 504 may be calculated and compared with a predetermined trend (also referred to herein as a curve) 510 representing the change in bulk relaxation modulus of the propellant grain with respect to time. Curve 310 may be used to determine a future value 309. Curve 510 may be compared with a pre-determined threshold value 520 of bulk relaxation modulus (k) and a future time 592 at which curve 510 will intersect with pre-determined threshold value 520 may be used to define future value 509. In this regard, calculated value 504 may be superimposed with curve 510 to estimate a time 592 at which the mechanical property (e.g., bulk relaxation modulus (k)) will reach the pre-determined threshold value 520. Value 520 can be determined by modeling and calculation, through measurement of propellant samples subjected to accelerated aging, and/or by destructive testing of a sacrificial solid rocket motor. In this regard, it may be determined that solid rocket motor 100 has a remaining lifespan of duration 580. Duration 580 may be measured in units of time, such as years, months, or days, for example.

Having described methods for non-destructively surveilling a mechanical property of a solid rocket motor propellant grain for determining a lifespan of a solid rocket motor, FIG. 6A through FIG. 7B illustrate various methods for applying a force to the propellant grain, as well as calculating the mechanical property.

Figure 6A:
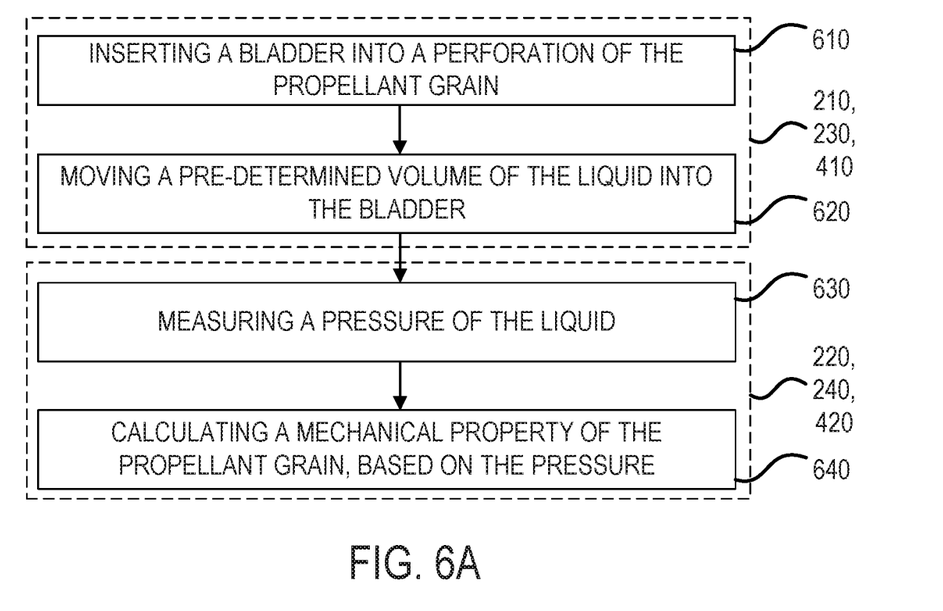
FIG. 6A illustrates sub-steps of the method of FIG. 2 and/or FIG. 4, including methods for applying a force (or pressure) to the propellant grain, as well as calculating the mechanical property, in accordance with various embodiments.

With reference to FIG. 6A, a step 210 and/or step 230 of method 200 of FIG. 2 and/or a step 410 of method 400 of FIG. 4 may include inserting a bladder into a perforation of the propellant grain (sub-step 610). Step 210 and/or step 230 of method 200 of FIG. 2 and/or a step 410 of method 400 of FIG. 4 may include moving a pre-determined volume of the liquid into the bladder (sub-step 620). Step 220 and/or step 240 of method 200 of FIG. 2 and/or a step 420 of method 400 of FIG. 4 may include measuring a pressure of the liquid (sub-step 630). Step 220 and/or step 240 of method 200 of FIG. 2 and/or a step 420 of method 400 of FIG. 4 may include calculating a mechanical property of the propellant grain, based on the pressure (sub-step 640).

Figure 7A:
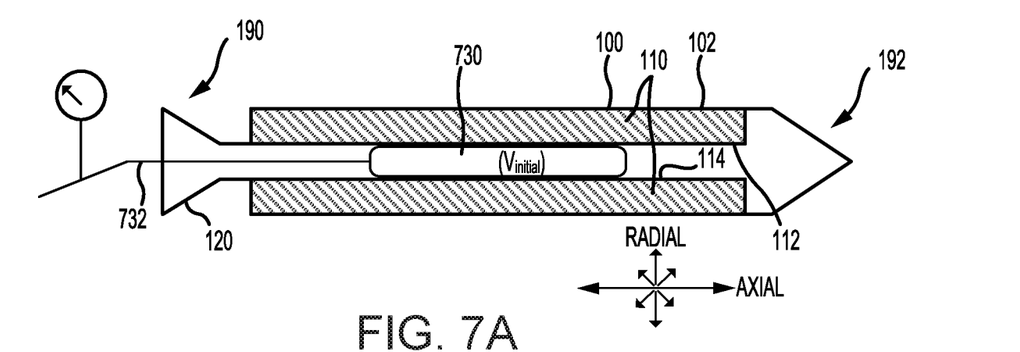
FIG. 7A illustrates a cross section view of the solid rocket motor of FIG. 1 with a bladder disposed in the perforation, in accordance with various embodiments.
Figure 7B:
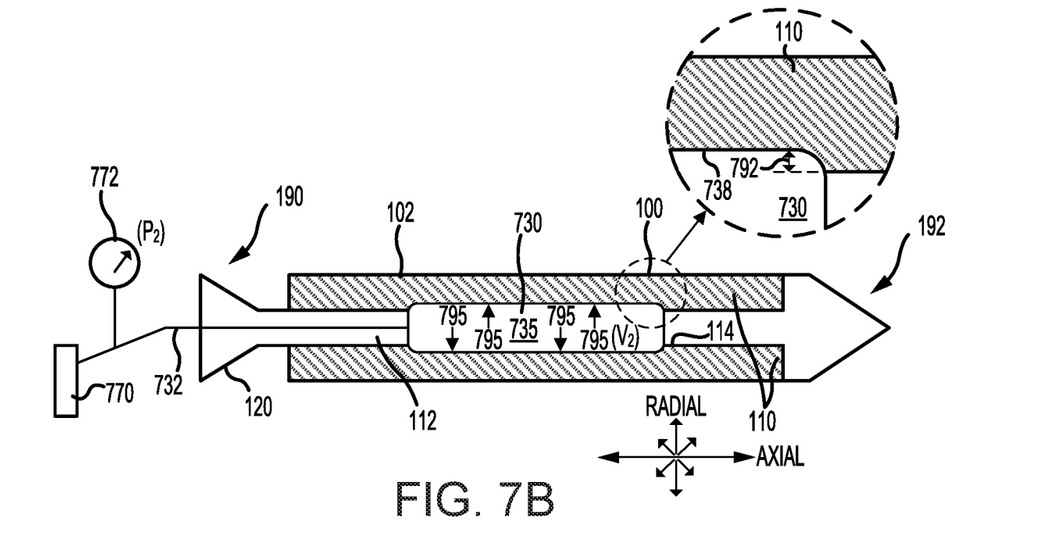
FIG. 7B illustrates a cross section view of the solid rocket motor of FIG. 7A with the bladder filled with a liquid, in accordance with various embodiments.

With respect to FIG. 7A and FIG. 7B, elements with like element numbering, as depicted in FIG. 1, are intended to be the same and will not necessarily be repeated for the sake of clarity.

With combined reference to FIG. 6A and FIG. 7A, sub-step 610 may include inserting a bladder 730 into perforation 112 of propellant grain 110. Bladder 730 may comprise a flexible bag that can be inflated with a liquid. In various embodiments, bladder 730 is made from a non-permeable elastic material capable of retaining a liquid. In various embodiments, bladder 730 is made from an elastic material, such as a natural rubber, a synthetic rubber, a polymer, a polychloroprene, or a nylon fabric, among others. Bladder 730 may be inserted into perforation 112. Bladder 730 may be inserted into perforation 112 via nozzle 120. Bladder 730 may include a hose 732 extending from bladder 730 through nozzle 120. Bladder 730 may comprise an initial volume ($V_{initial}$). In various embodiments, the diameter of bladder 730 at its initial volume may be substantially equal to the inside diameter of surface 114. In various embodiments, the initial volume may be the volume of bladder 730 at equilibrium. In this manner, all radial expansion of bladder 730 may correspond to deformation of propellant grain 110.

With combined reference to FIG. 6A and FIG. 7B, sub-step 620 may include moving a liquid 735 into bladder 730. Liquid 735 may be any incompressible liquid including water, a hydraulic fluid, etc. A liquid supply 770 may be connected to hose 732 to supply the liquid 735 to bladder 730. In various embodiments, liquid supply 770 may comprise a liquid cylinder. In various embodiments, sub-step 620 may include moving a pre-determined volume of liquid 735 into bladder 730. Thus, liquid 735 may be moved into bladder 730 in a controlled manner. Bladder 730 may expand in response to the liquid 735 being moved into bladder 730. For example, liquid 735 may exert a force, depicted by arrows 795, on bladder 730 which may cause bladder 730 to expand. Bladder 730 may contact surface 114 in response to liquid 735 filling bladder 730. Force 795 may be exerted onto surface 114 of propellant grain 110 in response to liquid 735 being moved into perforation 112, via bladder 730. Bladder 730 may be configured to expand solely in the radial direction in response to the pressurized liquid 735. In this regard, bladder 730 may be restrained from expanding in the axial direction. In various embodiments, bladder 730 may span the entire axial length of perforation 112 and nozzle 120 may be capped off to mechanically block bladder 730 from axially expanding. In various embodiments, bladder 730 may be designed to limit expansion to the radial direction only. Propellant grain 110 may deform in response to bladder 730 expanding against propellant grain 110. Thus, bladder 730 may comprise a volume ($V_2$) in response to being filled with liquid 735. In this regard, a change in volume of bladder 730 may correspond to a volume of deformation 738. For example, a deformation 738 comprising a depth 792 may be formed in propellant grain 110 in response to the pressurized liquid 735 being moved into bladder 730. The depth 792, and consequently the volume, of deformation 738 may correspond to a mechanical property of propellant grain 110, such as the bulk relaxation modulus (k) of propellant grain 110 for example. Force 795 may be a relatively small force, causing a relatively small deformation 738, such that the deformation 738 does not damage the performance of propellant grain 110.

Sub-step 630 may include measuring a pressure ($P_2$) of liquid 735. A pressure gauge 772 may be used to measure pressure ($P_2$). In this regard, pressure gauge 772 may be in fluid communication with bladder 730. Pressure ($P_2$) may be the pressure of the volume of liquid 735 in bladder 730.

In various embodiments, sub-step 620 includes moving a pre-determined volume of liquid 735 into bladder 730. In this regard, the volume of liquid 735 is controlled and the resulting pressure of the pre-determined volume of liquid 735 is dependent on the resistance of propellant grain 110 against the expansion of bladder 730. In this regard, the measured pressure of the pre-determined volume of liquid 735 may correspond to the bulk relaxation modulus (k) of propellant grain 110. For example, for a propellant grain that hardens over time, the measured pressure ($P_2$) may increase with each test over time (e.g., each year) in response to the same pre-determined volume of liquid 735, since the resistance of propellant grain 110 against the increase in volume of bladder 730 increases with time. In this manner, a change in the bulk relaxation modulus (k) of propellant grain 110 may be surveilled with respect to time based upon the measured pressure ($P_2$). In this regard, a single pressure ($P_2$) may be measured and compared with a trend (see FIG. 5) to determine a remaining lifespan of propellant grain 110 or a plurality of pressures ($P_2$) may be measured over time (see FIG. 3A and FIG. 3B) to determine a remaining lifespan of propellant grain 110. In this manner, propellant grain 110 may be aged. In this regard, the Y-axis of FIG. 3A, FIG. 3B, and FIG. 5 may be "pressure ($P_2$)" instead of "modulus." However, it is understood herein that, in various embodiments, the pressure ($P_2$) corresponds to the modulus of propellant grain 110. In this regard, the modulus of propellant grain 110 may be calculated using the measured pressure ($P_2$).

Figure 6B:
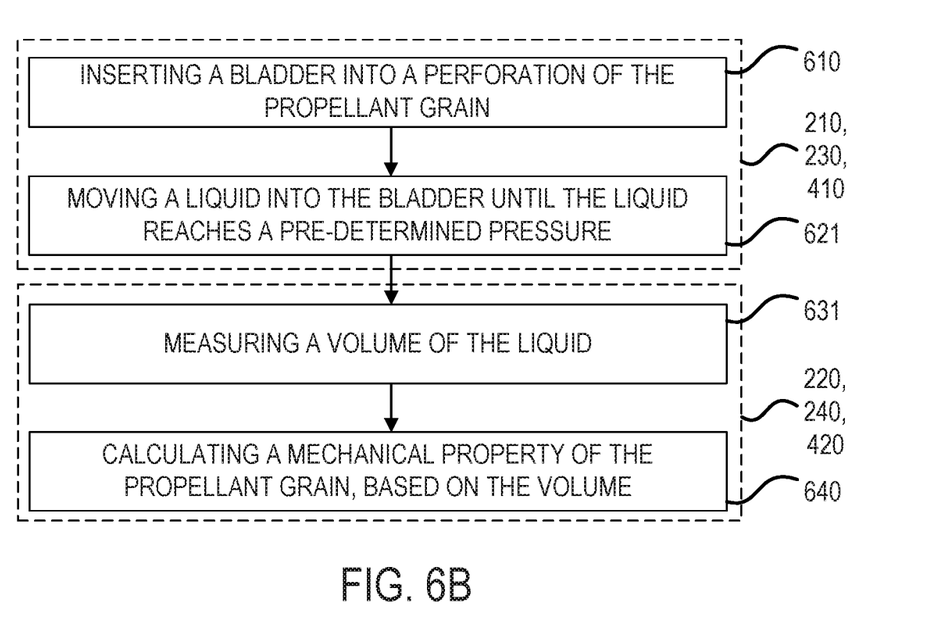
FIG. 6B illustrates sub-steps of the method of FIG. 2 and/or FIG. 4, including methods for applying a force (or pressure) to the propellant grain, as well as calculating the mechanical property, in accordance with various embodiments.

With respect to FIG. 6B, elements with like element numbering, as depicted in FIG. 6A, are intended to be the same and will not necessarily be repeated for the sake of clarity. With reference to FIG. 6B, instead of moving a pre-determined volume of the liquid into the bladder (see sub-step 620 of FIG. 6A), step 210 and/or step 230 of method 200 of FIG. 2 and/or a step 410 of method 400 of FIG. 4 may include moving a liquid 735 into bladder 730 until the liquid 735 reaches a pre-determined pressure (sub step 621). In this regard, step 220 and/or step 240 of method 200 of FIG. 2 and/or a step 420 of method 400 of FIG. 4 may include measuring a volume of the liquid required to reach the pre-determined pressure (sub-step 631). In this regard, the pressure of liquid 735 is controlled and the resulting volume of the liquid 735 is dependent on the resistance of propellant grain 110 against the expansion of bladder 730. In this regard, the measured volume of the pre-determined pressure ($P_2$) of liquid 735 may correspond to the bulk relaxation modulus (k) of propellant grain 110. For example, more liquid 735 may be required to reach the pre-determined pressure ($P_2$) of liquid 735 for a softer propellant grain 110 than if propellant grain were harder. Therefore, for a propellant grain that hardens over time, less liquid 735 may be required over time for each successive measurement (e.g., if measurements are taken each year for example) in order to reach the pre-determined pressure ($P_2$). In this manner, a change in the bulk relaxation modulus (k) of propellant grain 110 may be surveilled with respect to time based upon a measured volume ($V_2$) of liquid 735. In this regard, a single volume ($V_2$) may be measured and compared with a trend (see FIG. 5) to determine a remaining lifespan of propellant grain 110 or a plurality of volumes ($V_2$) may be measured over time (see FIG. 3A and FIG. 3B) to determine a remaining lifespan of propellant grain 110. In this manner, propellant grain 110 may be aged. In this regard, the Y-axis of FIG. 3A, FIG. 3B, and FIG. 5 may be "volume ($V_2$)" instead of "modulus." However, it is understood herein that, in various embodiments, the volume ($V_2$) corresponds to the modulus of propellant grain 110. In this regard, the modulus of propellant grain 110 may be calculated using the measured volume ($V_2$).

In various embodiments, the ambient temperature and atmospheric pressure are known so that any change in temperature or atmospheric pressure between calculations may be taken into account. The methods described herein assume that liquid 735 is incompressible. Furthermore, the methods described herein assume that bladder 730 is designed such that volume changes are imparted entirely on the propellant grain 110 (i.e., bladder 730 does not expand into unoccupied volume, for example, radial expansion only, not axial). Furthermore, the methods described herein assume that the initial volume of bladder 730 and unencumbered volumetric expansion of bladder 730 are known. Furthermore, the methods described herein assume that liquid 735 does not escape bladder 730 during testing. Moreover, the methods described herein assume the bladder 730, the liquid 735, and the propellant grain 110 are at thermal equilibrium during testing. In this regard, the work done on propellant grain 110 can be calculated by measuring the change in volume of bladder 730 resulting from the pressure increase of liquid 735.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for non-destructively aging a solid rocket motor propellant grain, wherein the solid rocket motor propellant grain comprises a solid mass with an exposed inner surface area defining a perforation in the interior of the solid rocket motor propellant grain, the method comprising:
   disposing a bladder into the perforation;
   moving a liquid into the bladder;
   applying a force to a surface of the solid rocket motor propellant grain via the liquid, wherein a deformation is formed on the surface of the solid rocket motor propellant grain in response to the application of the force; and
   measuring at least one of a pressure of the liquid or a volume of the liquid.

2. The method of claim 1, further comprising determining a lifespan of the solid rocket motor propellant grain based on at least one of the pressure of the liquid or the volume of the liquid.

3. The method of claim 1, further comprising
   measuring the pressure of the liquid immediately after the liquid has reached equilibrium with the solid rocket motor propellant grain.

4. The method of claim 3, further comprising pressurizing the liquid in the bladder, wherein the deformation is formed in response to the liquid being pressurized.

5. The method of claim 4, wherein the liquid is contained within the bladder.

6. The method of claim 5, wherein the bladder is configured to expand solely in a radial direction.

7. The method of claim 6, further comprising calculating a value of a mechanical property of the solid rocket motor propellant grain based upon the deformation, wherein the mechanical property comprises a bulk relaxation modulus (k) calculated using equation $$k = \frac{P}{\frac{\Delta V}{V_{initial}}},$$

where P is the measured pressure, $\Delta V$ is a change in volume of the bladder, and $V_{initial}$ is a volume of the bladder before it expands against the solid rocket motor propellant grain.

8. A method for non-destructively surveilling a mechanical property of a solid rocket motor propellant grain, comprising:
    applying a first force to a surface of the solid rocket motor propellant grain at a first time, wherein a first deformation is formed on the surface of the solid rocket motor propellant grain in response to the applying the first force;
    measuring a first value of a relaxation modulus of the solid rocket motor propellant grain based on the first deformation;
    applying a second force to the surface of the solid rocket motor propellant grain at a second time, wherein a second deformation is formed on the surface of the solid rocket motor propellant grain in response to the applying the second force; and
    measuring a second value of the relaxation modulus of the solid rocket motor propellant grain based on the second deformation,
    wherein at least one of the first force or the second force is applied to the surface by moving a liquid into a bladder disposed at least partially within a perforation of the solid rocket motor propellant grain.

9. The method of claim 8, further comprising comparing the first value with the second value.

10. The method of claim 9, further comprising predicting a future value of the relaxation modulus based on a trend between the first value and the second value.

11. The method of claim 10, further comprising determining a remaining lifespan of the solid rocket motor propellant grain based on a comparison between the future value and a pre-determined design threshold.

12. The method of claim 8, wherein the liquid is pressurized in response to moving a pre-determined volume of the liquid into the perforation.

13. The method of claim 12, wherein the first value of the relaxation modulus is measured by measuring a pressure of the liquid.

14. The method of claim 8, wherein the liquid is moved into the bladder until the liquid reaches a predetermined pressure.

15. The method of claim 14, wherein at least one of the first deformation or the second deformation is formed in response to the liquid being pressurized.

16. The method of claim 14, wherein the first value of the relaxation modulus is measured by measuring a volume of the liquid.

17. A solid rocket motor propellant grain arrangement, comprising:
    a case;
    a propellant grain disposed within the case;
    a perforation extending through the propellant grain; and
    a bladder disposed within the perforation,
    wherein the bladder is configured to:
        receive a pre-determined volume of a liquid;
        expand in response to receiving the pre-determined volume of the liquid; and
        deform a surface of the propellant grain in response to the expanding.

18. The solid rocket motor propellant grain arrangement of claim 17, further comprising a hose coupled to the bladder extending from the propellant grain and in fluid communication with a liquid supply.

19. The solid rocket motor propellant grain arrangement of claim 18, further comprising a pressure gauge in fluid communication with the bladder.

* * * * *